(12) United States Patent
Galbraith

(10) Patent No.: US 9,802,523 B1
(45) Date of Patent: Oct. 31, 2017

(54) GOLF CART BEVERAGE HOLDER SYSTEMS

(71) Applicant: Robert Galbraith, Pinellas Park, FL (US)

(72) Inventor: Robert Galbraith, Pinellas Park, FL (US)

( * ) Notice: Subject to any disclaimer, the term of this patent is extended or adjusted under 35 U.S.C. 154(b) by 8 days.

(21) Appl. No.: 15/170,293

(22) Filed: Jun. 1, 2016

(51) Int. Cl.
*B60N 3/00* (2006.01)
*B60N 3/10* (2006.01)
*B60L 1/00* (2006.01)

(52) U.S. Cl.
CPC ............... *B60N 3/103* (2013.01); *B60L 1/00* (2013.01); *B60N 3/104* (2013.01)

(58) Field of Classification Search
CPC ........... B60N 3/103; B60N 3/104; B60L 1/00; B60H 1/00592; F25D 31/07; F25D 2331/809; F25B 21/04
USPC .......................................................... 224/274
See application file for complete search history.

(56) References Cited

U.S. PATENT DOCUMENTS

| | | | | |
|---|---|---|---|---|
| 4,103,510 A | * | 8/1978 | Hall | B60H 1/005 62/243 |
| 4,183,226 A | * | 1/1980 | Moore | B65D 81/3883 220/903 |
| 4,383,422 A | | 5/1983 | Gordon | |
| 4,719,764 A | * | 1/1988 | Cook | F25D 11/00 297/180.14 |
| 5,168,718 A | * | 12/1992 | Bergmann | B60H 1/00592 62/244 |
| 5,720,171 A | * | 2/1998 | Osterhoff | A47J 36/2461 62/298 |
| 6,155,063 A | * | 12/2000 | Felde | A47J 31/005 296/37.12 |
| 6,276,753 B1 | * | 8/2001 | Sur | A47C 7/54 297/188.19 |
| 6,533,232 B1 | * | 3/2003 | Aggeler | B60N 3/104 220/737 |
| 6,640,551 B1 | * | 11/2003 | Slone | F25B 21/04 62/244 |
| 6,973,799 B2 | | 12/2005 | Kuehl | |
| 9,127,873 B2 | * | 9/2015 | Tarr | F25D 11/025 |
| 9,163,863 B1 | * | 10/2015 | Armstrong | B60N 3/104 |
| 2010/0258268 A1 | * | 10/2010 | Li | F25D 31/007 165/64 |
| 2012/0217772 A1 | * | 8/2012 | Tang | B60N 3/104 297/188.01 |

* cited by examiner

*Primary Examiner* — Peter Helvey
(74) *Attorney, Agent, or Firm* — Integrity Patent Group, PLC; Edwin Wold

(57) ABSTRACT

A golf cart beverage holder system having at least one right-side-beverage-holder and at least one left-side-beverage-holder for holding beverage containers and keeping drinks cold during a round of golf. The golf cart beverage holder system is adapted to fit inside existing cup holders on a golf cart.

18 Claims, 4 Drawing Sheets

GOLF CART BEVERAGE HOLDER SYSTEMS

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. FIELD OF THE INVENTION

The present invention relates generally to the field of beverage holders and more specifically relates to golf cart beverage holder systems.

2. DESCRIPTION OF RELATED ART

Golf is a club and ball sport in which players use various clubs to hit balls into a series of holes on a course in as few strokes as possible. Golf is one of the few ball games that do not require a standardized playing area. The game is played on a course with an arranged progression of either nine or 18 holes. Each hole on the course must contain a tee box to start from, and a putting green containing the actual cup. There are other standard forms of terrain in between, such as the fairway, rough, and hazards, but each hole on a course is unique in its specific layout and arrangement. Golf is played for the lowest number of strokes by an individual, known as stroke play, or the lowest score on the most individual holes in a complete round by an individual or team, known as match play. Stroke play is the most commonly seen format at all levels. Often times golf is played during the summer when it is hot outside and players need cold drinks to cool off. Golf carts to not comprise drink holders suitable for keeping drinks cold for players. A suitable solution is desired.

Several attempts have been made to solve the above-mentioned problems such as those found in U.S. Pat. No. 4,183,226 to Stanley Moore; U.S. Pat. No. 4,383,422 to Jay Gordon; and U.S. Pat. No. 6,973,799 to Steven Kuehl. This art is representative of beverage holders. However, none of the above inventions and patents, taken either singly or in combination, is seen to describe the invention as claimed.

Preferably, a beverage holder should provide cooling means for keeping drinks cold and refreshing and, yet would operate reliably and be manufactured at a modest expense. Thus, a need exists for a reliable golf cart beverage holder system to avoid the above-mentioned problems.

BRIEF SUMMARY OF THE INVENTION

In view of the foregoing disadvantages inherent in the known beverage holder art, the present invention provides a novel golf cart beverage holder system. The general purpose of the present invention, which will be described subsequently in greater detail is to provide a device for keeping beverages cold on a golf cart when the weather gets warm. Golf cart beverage holder system helps stop the warming process of drinks desired to be cold.

A golf cart beverage holder system is disclosed in a preferred embodiment comprising a golf cart beverage holder assembly having at least one right-side-beverage-holder including a first-right-side-beverage holder, and a second-right-side-beverage holder, at least one left-side-beverage-holder comprising, a first-left-side-beverage holder, and a second-left-side-beverage holder, a right-side-wire bundle, a left-side-wire bundle, a first-right-side-cooling tube, a second-right-side-cooling tube, a first-left-side-cooling tube, a second-left-side-cooling tube, at least one power source, and a refrigerant unit comprising a cooling generator, a plurality of wires (wiring), a plurality of coils, and a mount. Those with ordinary skill in the art will now appreciate that upon reading this specification and by their understanding the art of use of refrigerant means and cooling as described herein, methods of cooling will be understood by those knowledgeable in such art.

The golf cart beverage holder system comprises in functional combination the golf cart beverage holder assembly and the refrigerant unit. The golf cart beverage holder assembly comprises the at least one right-side-beverage-holder, the at least one left-side-beverage-holder, the right-side-wire bundle, the left-side-wire bundle, the first-right-side-cooling tube, the second-right-side-cooling tube, the first-left-side-cooling tube, the second-left-side-cooling tube, and the at least one power source, structured and arranged in functional combination.

The at least one right-side-beverage-holder comprises the first-right-side-beverage holder and the second-right-side-beverage holder. The first-right-side-beverage holder and the second-right-side-beverage holder may be integrally formed. The first-right-side-beverage holder and the second-right-side-beverage holder comprise an inner volume for holding a beverage container. The first-right-side-beverage holder and the second-right-side-beverage holder comprise a circumference greater than a base of the beverage container.

The at least one left-side-beverage-holder comprises the first-left-side-beverage holder and the second-left-side-beverage holder. The first-left-side-beverage holder and the second-left-side-beverage holder are integrally formed. The first-left-side-beverage holder and the second-left-side-beverage holder comprise an inner volume for holding at least one beverage. The first-left-side-beverage holder and the second-left-side-beverage holder comprise a circumference greater than a base of the beverage container.

The refrigerant unit comprises the cooling generator, the plurality of wiring, the plurality of coils and the mount. The refrigerant unit provides cooling to the at least one right-side-beverage-holder and the at least one left-side-beverage-holder via the a first-right-side-cooling tube, the second-right-side-cooling tube, the first-left-side-cooling tube, the second-left-side-cooling tube. The first-right-side-cooling tube, the second-right-side-cooling tube, the first-left-side-cooling tube, the second-left-side-cooling tube transfer at least one fluid. The at least one fluid comprises refrigerant. The first-right-side-cooling tube, the second-right-side-cooling tube, the first-left-side-cooling tube, the second-left-side-cooling tube comprise a flexible tube. The first-right-side-cooling tube, the second-right-side-cooling tube, the first-left-side-cooling tube, the second-left-side-cooling tube comprise coolant wrap. The refrigerant flows along an inner wall of the at least one right-side-beverage-holder and the at least one left-side-beverage-holder to keep the at least one beverage cold. The inner wall is thermally insulated to resist heat transfer. The at least one power source and refrigerant unit may be housed under a hood of a golf cart or alternatively under seats of the golf cart out of sight.

The golf cart beverage holder assembly is mountable to the golf cart. The golf cart beverage holder assembly is installed on a golf cart. The golf cart beverage holder assembly is powered by a battery of the golf cart. The golf cart beverage holder assembly is useful for keeping at least one beverage cold during a round of golf. The golf cart beverage holder system is adapted to fit inside existing cup holders on a golf cart.

The present invention holds significant improvements and serves as a golf cart beverage holder system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, golf cart beverage holder systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to beverage holders and more particularly to a golf cart beverage holder system as used to improve the means by which user's are able to maintain a cold drink temperature.

Figure 1:
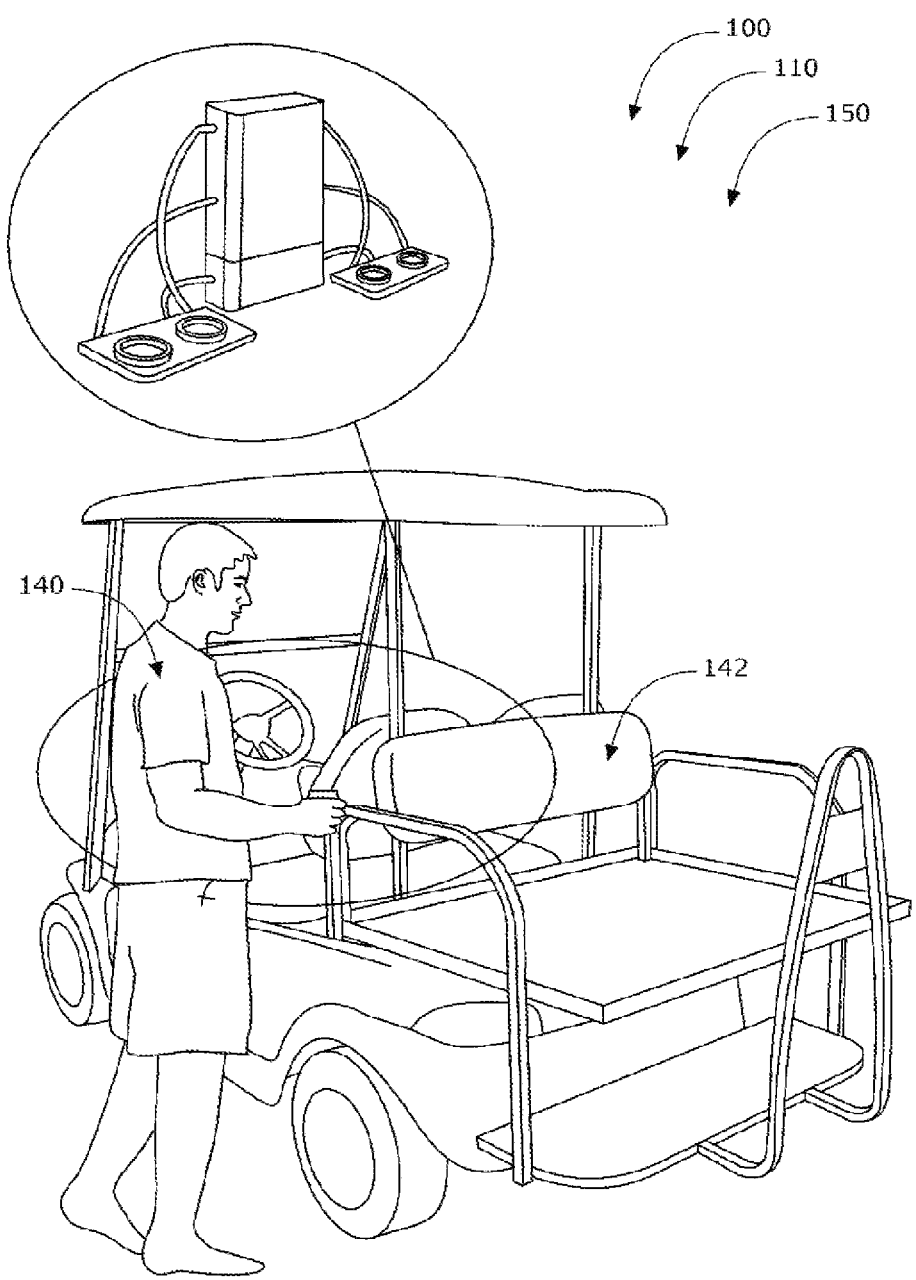
FIG. 1 shows a perspective view illustrating a golf cart beverage holder system comprising a golf cart beverage holder assembly during an 'in-use' condition showing a user golfing and the device in an installed condition on a golf cart according to an embodiment of the present invention.
Figure 2:
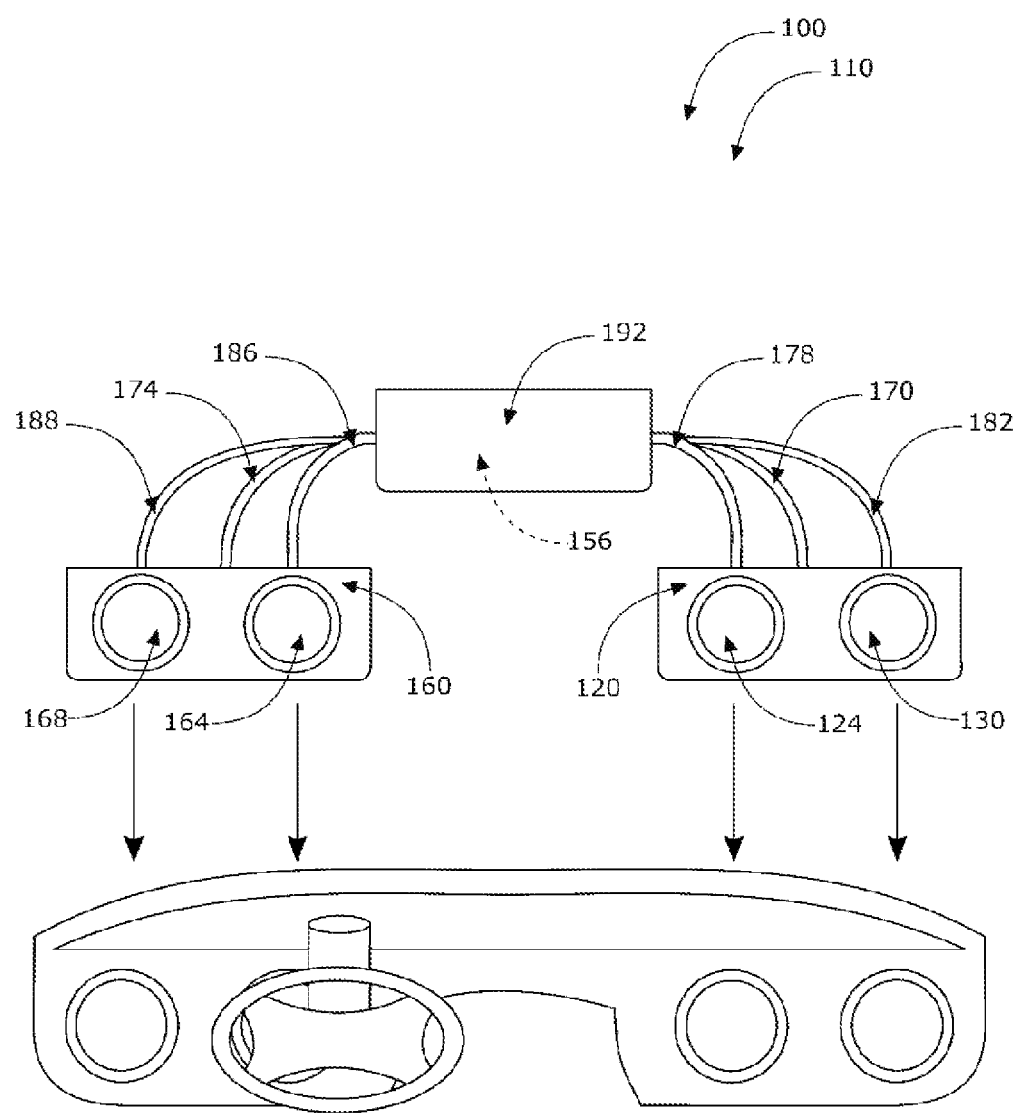
FIG. 2 is a perspective view illustrating the golf cart beverage holder assembly comprising at least one right-side-beverage-holder, at least one left-side-beverage-holder, and a refrigerant unit according to an embodiment of the present invention of FIG. 1.
Figure 3:
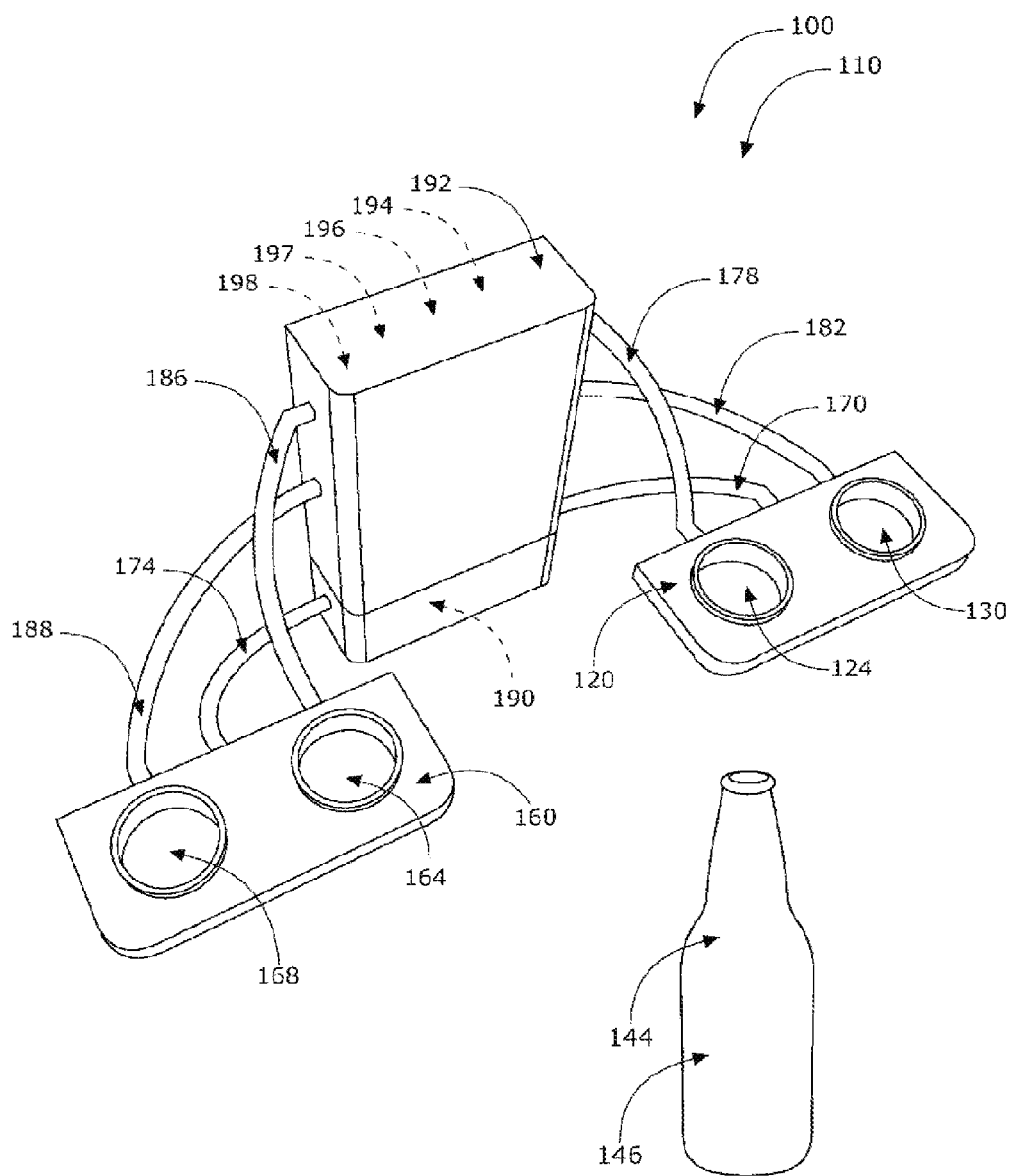
FIG. 3 is a perspective view illustrating the golf cart beverage holder assembly according to an embodiment of the present invention.
Figure 4:
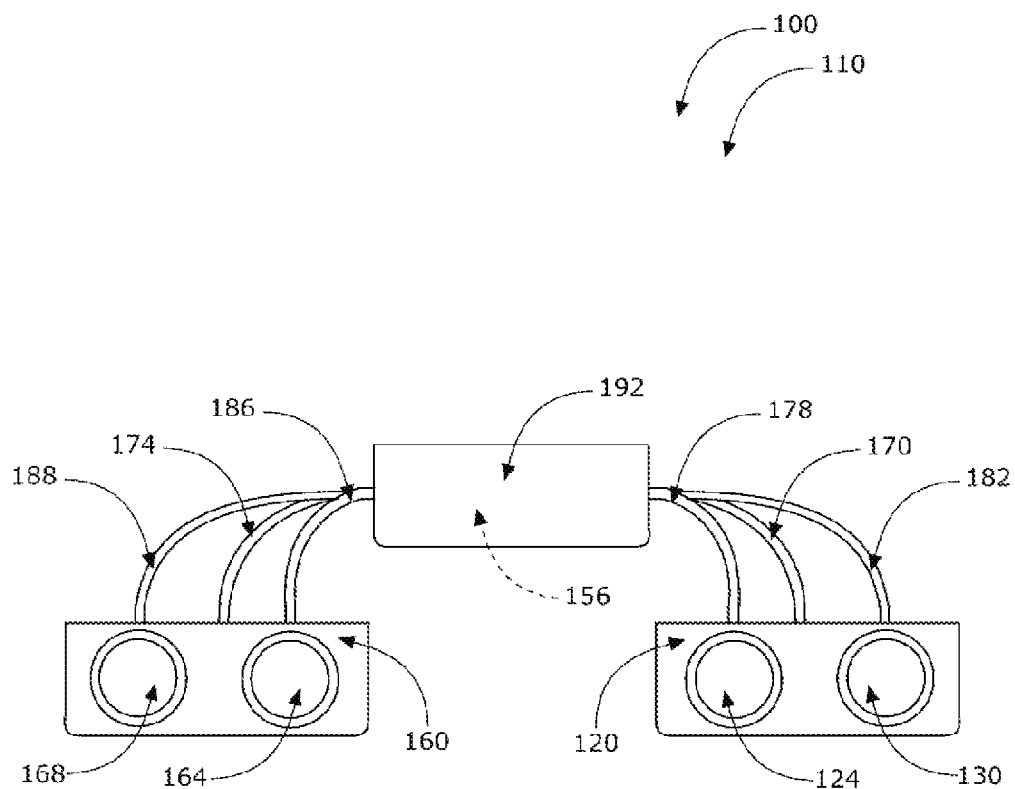
FIG. 4 is a top view illustrating the golf cart beverage holder assembly according to an embodiment of the present invention.

Referring to the drawings by numerals of reference there is shown in FIGS. 1-4, golf cart beverage holder system 100 according to an embodiment of the present invention. Golf cart beverage holder system 100 may comprise golf cart beverage holder assembly 110, which may comprise at least one right-side-beverage-holder 120 including first-right-side-beverage holder 124, and second-right-side-beverage holder 130, at least one left-side-beverage-holder 160 comprising first-left-side-beverage holder 164, and second-left-side-beverage holder 168, right-side-wire bundle 170, left-side-wire bundle 174, first-right-side-cooling tube 178, second-right-side-cooling tube 182, first-left-side-cooling tube 186, a second-left-side-cooling tube 188, at least one power source 190, and refrigerant unit 192 comprising, cooling generator 194, plurality of wiring 196, plurality of coils 197, and mount 198.

Golf cart beverage holder system 100 comprises in functional combination the golf cart beverage holder assembly 110 and refrigerant unit 192. Golf cart beverage holder assembly 110 comprises at least one right-side-beverage-holder 120, at least one left-side-beverage-holder 160, right-side-wire bundle 170, left-side-wire bundle 174, first-right-side-cooling tube 178, second-right-side-cooling tube 182, first-left-side-cooling tube 186, second-left-side-cooling tube 188, and at least one power source 190 structured and arranged in functional combination. At least one right-side-beverage-holder 120 comprises first-right-side-beverage holder 124 and second-right-side-beverage holder 130. At least one left-side-beverage-holder 160 comprises first-left-side-beverage holder 164 and second-left-side-beverage holder 168.

Refrigerant unit 192 comprises cooling generator 194, plurality of wiring 196, plurality of coils 197 and mount 198. Refrigerant unit 192 provides cooling to at least one right-side-beverage-holder 120 and at least one left-side-beverage-holder 160 via first-right-side-cooling tube 178, second-right-side-cooling tube 182, first-left-side-cooling tube 186, and second-left-side-cooling tube 188. Golf cart beverage holder assembly 110 is installed on a golf cart 142. Golf cart beverage holder assembly 110 is useful for keeping at least one beverage 144 cold during a round of golf. Golf cart beverage holder assembly 110 is powered by a battery of the golf cart or removable batteries.

First-right-side-beverage holder 124 and second-right-side-beverage holder 130 are integrally formed. First-right-side-beverage holder 124 and second-right-side-beverage holder 130 comprise an inner volume for holding beverage container 146. First-left-side-beverage holder 164 and second-left-side-beverage holder 168 are integrally formed. First-left-side-beverage holder 164 and second-left-side-beverage holder 168 comprise an inner volume for holding at least one beverage 144. First-right-side-cooling tube 178, second-right-side-cooling tube 182, first-left-side-cooling tube 186, second-left-side-cooling tube 188 transfer at least one fluid. First-right-side-cooling tube 178, second-right-side-cooling tube 182, first-left-side-cooling tube 186, second-left-side-cooling tube 188 comprise a flexible tube. First-right-side-cooling tube 178, second-right-side-cooling tube 182, first-left-side-cooling tube 186, second-left-side-cooling tube 188 comprise coolant wrap.

Golf cart beverage holder assembly 110 is mountable to golf cart 142. At least one fluid comprises refrigerant. Refrigerant flows along inner wall 154 of at least one right-side-beverage-holder 120 and at least one left-side-beverage-holder 168 to keep at least one beverage cold 144. Inner wall 154 is thermally insulated. Power source 190 comprises a removable battery 156. Removable battery 156 is rechargeable. First-right-side-beverage holder 124 and the second-right-side-beverage holder 130 comprise a circumference greater than a base of beverage container 146. First-left-side-beverage holder 164 and second-left-side-beverage holder 168 comprise a circumference greater than a base of beverage container 146.

It should be noted that golf cart beverage holder system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the amended claims:

1. A golf cart beverage holder system comprising:
  a golf cart beverage holder assembly;
    at least one right-side-beverage-holder including;
      a first-right-side-beverage holder; and
      a second-right-side-beverage holder;
    at least one left-side-beverage-holder comprising;
      a first-left-side-beverage holder; and
      a second-left-side-beverage holder;
    a right-side-wire bundle;
    a left-side-wire bundle;
    a first-right-side-cooling tube;
    a second-right-side-cooling tube;
    a first-left-side-cooling tube;
    a second-left-side-cooling tube;
    at least one power source; and
  a refrigerant unit comprising;
    a cooling generator;
    a plurality of wiring;
    a plurality of coils; and
    a mount;
  wherein said golf cart beverage holder system comprises in functional combination said golf cart beverage holder assembly and said refrigerant unit;
  wherein said golf cart beverage holder assembly comprises said at least one right-side-beverage-holder, said at least one left-side-beverage-holder, said right-side-wire bundle, said left-side-wire bundle, said first-right-side-cooling tube, said second-right-side-cooling tube, said first-left-side-cooling tube, said second-left-side-cooling tube, and said at least one power source, structured and arranged in functional combination;
  wherein said at least one right-side-beverage-holder comprises said first-right-side-beverage holder and said second-right-side-beverage holder;
  wherein said at least one left-side-beverage-holder comprises said first-left-side-beverage holder and said second-left-side-beverage holder;
  wherein said refrigerant unit comprises said cooling generator, said plurality of wiring, said plurality of coils and said mount;
  wherein said refrigerant unit provides cooling to said at least one right-side-beverage-holder and said at least one left-side-beverage-holder via said a first-right-side-cooling tube, said second-right-side-cooling tube, said first-left-side-cooling tube, said second-left-side-cooling tube;
  wherein said golf cart beverage holder assembly is installed on a golf cart; and
  wherein said golf cart beverage holder assembly is useful for keeping at least one beverage cold during a round of golf.

2. The golf cart beverage holder system of claim 1 wherein said golf cart beverage holder assembly is powered by a battery of said golf cart.

3. The golf cart beverage holder system of claim 1 wherein said first-right-side-beverage holder and said second-right-side-beverage holder are integrally formed.

4. The golf cart beverage holder system of claim 3 wherein said first-right-side-beverage holder and said second-right-side-beverage holder comprise an inner volume for holding a beverage container.

5. The golf cart beverage holder system of claim 4 wherein said first-left-side-beverage holder and said second-left-side-beverage holder are integrally formed.

6. The golf cart beverage holder system of claim 1 wherein said first-left-side-beverage holder and said second-left-side-beverage holder comprise an inner volume for holding at least one beverage.

7. The golf cart beverage holder system of claim 6 wherein said first-right-side-cooling tube, said second-right-side-cooling tube, said first-left-side-cooling tube, said second-left-side-cooling tube transfer at least one fluid.

8. The golf cart beverage holder system of claim 7 wherein said first-right-side-cooling tube, said second-right-side-cooling tube, said first-left-side-cooling tube, said second-left-side-cooling tube comprise a flexible tube.

9. The golf cart beverage holder system of claim 1 wherein said first-right-side-cooling tube, said second-right-side-cooling tube, said first-left-side-cooling tube, said second-left-side-cooling tube comprise coolant wrap.

10. The golf cart beverage holder system of claim 6 wherein said golf cart beverage holder assembly is mountable to said golf cart.

11. The golf cart beverage holder system of claim 1 wherein said at least one fluid comprises refrigerant.

12. The golf cart beverage holder system of claim 1 wherein said refrigerant flows along an inner wall of said at least one right-side-beverage-holder and said at least one left-side-beverage-holder to keep said at least one beverage cold.

13. The golf cart beverage holder system of claim 12 wherein said inner wall is thermally insulated.

14. The golf cart beverage holder system of claim 1 wherein said power source comprises a removable battery.

15. The golf cart beverage holder system of claim 14 wherein said battery is rechargeable.

16. The golf cart beverage holder system of claim 1 wherein said first-right-side-beverage holder and said second-right-side-beverage holder comprise a circumference greater than a base of said beverage container.

17. The golf cart beverage holder system of claim 16 wherein said first-left-side-beverage holder and said second-left-side-beverage holder comprise a circumference greater than a base of said beverage container.

18. A golf cart beverage holder system comprising:
  a golf cart beverage holder assembly;
    at least one right-side-beverage-holder including;
      a first-right-side-beverage holder; and
      a second-right-side-beverage holder;
    at least one left-side-beverage-holder comprising;
      a first-left-side-beverage holder; and
      a second-left-side-beverage holder;
    a right-side-wire bundle;
    a left-side-wire bundle;
    a first-right-side-cooling tube;
    a second-right-side-cooling tube;
    a first-left-side-cooling tube;
    a second-left-side-cooling tube;
    at least one power source; and
  a refrigerant unit comprising;
    a cooling generator;
    a plurality of wiring;
    a plurality of coils; and
    a mount;
  wherein said golf cart beverage holder system comprises in functional combination said golf cart beverage holder assembly and said refrigerant unit;
  wherein said golf cart beverage holder assembly comprises said at least one right-side-beverage-holder, said at least one left-side-beverage-holder, said right-side-wire bundle, said left-side-wire bundle, said first-right-side-cooling tube, said second-right-side-cooling tube, said first-left-side-cooling tube, said second-left-side-cooling tube, and said at least one power source, structured and arranged in functional combination;
  wherein said at least one right-side-beverage-holder comprises said first-right-side-beverage holder and said second-right-side-beverage holder;
  wherein said first-right-side-beverage holder and said second-right-side-beverage holder are integrally formed;
  wherein said first-right-side-beverage holder and said second-right-side-beverage holder comprise an inner volume for holding a beverage container;
  wherein said first-right-side-beverage holder and said second-right-side-beverage holder comprise a circumference greater than a base of said beverage container;
  wherein said at least one left-side-beverage-holder comprises said first-left-side-beverage holder and said second-left-side-beverage holder;
  wherein said first-left-side-beverage holder and said second-left-side-beverage holder are integrally formed;
  wherein said first-left-side-beverage holder and said second-left-side-beverage holder comprise an inner volume for holding at least one beverage;
  wherein said first-left-side-beverage holder and said second-left-side-beverage holder comprise a circumference greater than a base of said beverage container;
  wherein said refrigerant unit comprises said cooling generator, said plurality of wiring, said plurality of coils and said mount;
  wherein said refrigerant unit provides cooling to said at least one right-side-beverage-holder and said at least one left-side-beverage-holder via said a first-right-side-cooling tube, said second-right-side-cooling tube, said first-left-side-cooling tube, said second-left-side-cooling tube;
  wherein said first-right-side-cooling tube, said second-right-side-cooling tube, said first-left-side-cooling tube, said second-left-side-cooling tube transfer at least one fluid;
  wherein said at least one fluid comprises refrigerant;
  wherein said first-right-side-cooling tube, said second-right-side-cooling tube, said first-left-side-cooling tube, said second-left-side-cooling tube comprise a flexible tube;
  wherein said first-right-side-cooling tube, said second-right-side-cooling tube, said first-left-side-cooling tube, said second-left-side-cooling tube comprise coolant wrap;
  wherein said refrigerant flows along an inner wall of said at least one right-side-beverage-holder and said at least one left-side-beverage-holder to keep said at least one beverage cold;
  wherein said inner wall is thermally insulated;
  wherein said golf cart beverage holder assembly is mountable to said golf cart;
  wherein said golf cart beverage holder assembly is installed on a golf cart;
  wherein said golf cart beverage holder assembly is powered by a battery of said golf cart; and
  wherein said golf cart beverage holder assembly is useful for keeping at least one beverage cold during a round of golf.

* * * * *